Feb. 15, 1966 R. N. AUGER 3,234,955

FLUID AMPLIFIERS

Filed Oct. 1, 1962 2 Sheets-Sheet 2

3,234,955
FLUID AMPLIFIERS

Raymond N. Auger, 456 Riverside Drive,
New York 27, N.Y.

Filed Oct. 1, 1962, Ser. No. 227,462
6 Claims. (Cl. 137—81.5)

This invention relates to fluid amplifiers, and, more particularly, to fluid amplifiers for use in computer or logic circuits. In the practice of the present invention certain principles of laminar and turbulent fluid flow phenomena are utilized in a novel manner not heretofore known.

Fluid amplifiers utilize a moving liquid or gas fluid in a manner analogous to electron and positive hole flow in vacuum tubes and semiconductor devices, respectively. Computer systems comprised of networks of pneumatic or hydraulic logic elements inherently possess important advantages in reliability and cost over their electronic counterparts. Although operating at switching speeds several orders of magnitude slower than modern-day electronic computers, pneumatically or hydraulically operated logic systems have wide applicability in certain areas of computer and control technology where extremely high speed is not required.

Fluid logic elements are inexpensive and relatively easy to manufacture. The economic advantage of pneumatic components over relays and other conventional electrically-actuated switching devices is enhanced by the fact that associated system components, such as limit switches, push buttons, indicators, and the like, can be readily manufactured at considerably less cost than their counterparts in an electrical system. Manually or mechanically operated switches in a pneumatic system may typically be created by closing off an orifice through which a very small amount of air flows at low pressure into the atmosphere. The resulting increase of pressure in the air line leading to the orifice can then be utilized to operate a fluid amplifier element.

It is an important advantage that the monitoring and measurement of the various flow streams in a pneumatic system may be readily accomplished with a manometer which is the pneumatic counterpart of the voltmeter in an electrical network. Manometers, unlike their electrical counterparts, cost very little to make and because of their small size can be closely spaced together on a control panel. Another advantage of low-pressure fluid-actuated elements and monitoring devices is that they cannot be "burned out" in the event of accidental system overloads.

Pneumatic circuit configurations which are repetitive can be cast in plastic or similar material and permanently joined to a group of other elements with a single production step. On account of the great manufacturing economy with which these pneumatic elements and circuits can be built, many techniques may be employed in system design which often are not economically feasible for electrical equipment performing a similar function. Examples of such techniques include: duplication of circuits to increase system reliability in the event of component failure, self-checking and verification schemes in computer networks, multiplexing and diversity techniques for distance transmission, etc.

Prior to my invention, pneumatic logic elements were one of two general types. The first of these prior art devices employs a controlled variation in the pressure level of a fluid to position a ball or cylinder valve moving within a fluid-filled chamber to regulate fluid flow. Such a mechanism, involving a moving part, possesses several substantial disadvantages and limitations, including susceptibility to wear due to friction and erosion or distortion of the moving element. Secondly, if pneumatically operated, a minimum starting force is required to initiate movement of the piston cylinder or ball and actuate the mechanism. This corresponds to an undesirable "dead zone" in the operation of the logic element. Furthermore, due to the inertia of the moving part, the response time of the logic element is related to the magnitude of the actuating force. Accordingly, in order to achieve reasonably fast computer speed in pneumatic elements of this type, it has been necessary to make the actuating force of relatively large magnitude, thus causing concomitant increases in the wear of the mechanism and its energy consumption. Since, in many circuit applications, it is desirable, if not required, for the logic units to possess proportional action throughout a range, this type of pneumatic logic element is not generally satisfactory for such applications.

The second general type of pneumatic logic element known to the art utilizes the controlled interaction of a plurality of fluid streams to provide a fluid-actuated system which has no moving parts. In such a system, one or more fluid "control" streams is employed to controllably deflect the path of flow of a fluid "power" stream which follows, or more precisely "hugs" due to the phenomenon of "entrainment asymmetry," the contour of a wall surface. (Pneumatic systems of this latter type are described in the June 7, 1961, issue of "Electronics Design" magazine.) This second type of pneumatic logic elements, while overcoming many of the drawbacks associated with the first type because of the elimination of moving mechanical parts, also suffers from serious disadvantages which make it considerably less than ideal for many applications. A significant disadvantage posed by logic elements of this latter type is the impedance matching problem presented when one or more such elements are used in a logic circuit. Since the fluid flows or pressures at any given terminal of the element are affected appreciably by the fluid flows or pressures present at all the other terminals of the element, any attempt to operate such an element as a logic unit in a circuit network of any complexity creates considerable difficulties requiring special design attention. Also, logic elements of this type suffer limitations similar to that possessed by the other known type in that both are basically switching devices exhibiting hysteresis effects, and therefore these conventional fluid-actuated mechanisms are not readily adaptable for use in circuit applications requiring proportional action throughout a range of operation.

The present invention is directed to a fluid-actuated element of novel construction, exemplarily a pneumatic amplifier, utilizing certain principles of laminar and turbulent flow of a submerged fluid stream, i.e., a fluid flowing in an atmosphere of the same character. I have found that the application of a fluid "control" stream, interjected at an inclination with a second stream which is in a condition of laminar flow, with both of said streams being submerged in an atmosphere of the same character (that is, gas-in-gas or liquid-in-liquid), will cause the flow of fluid in the second or "supply" stream to become turbulent when a sufficiently high pneumatic pressure is achieved in the control stream. The transition from laminar to turbulent flow condition in the supply stream may be effected with a relatively low fluid velocity and volume in the interjected control stream, as compared with the velocity and volume level of fluid present in the supply stream. If the flow of the supply stream, beyond the point of its interception by the interjected control stream, is then directed into a receiver or output tube, it is possible to obtain in the output tube a fluid volume and pressure which is considerably greater than the corresponding fluid volume and pressure required to produce a turbulent condition in the flow of fluid in the supply stream through manipulation of the control stream. The result of such an arrangement of supply stream, interjected control stream, and output receiver is that the fluid flow changes which take place at the output tube in response to corresponding variations of flow in the control stream can be, under suitable operating conditions, of substantially greater magnitude than the variations in the control stream. Thus, in a manner roughly analogous to the flow of electrons in a vacuum tube triode, input signals applied to the circuit are used to control disturbances in the fluid flow of the supply stream and appear at the output of the device, in amplified form, as corresponding variations in the fluid flow of the supply stream.

The above-described phenomena may be utilized in a pneumatic logic system according to the present invention in the form of a basic or elemental amplifier circuit which comprises a first airstream emitted from the orifice of a "supply" tube, a second airstream emitted from a "control" tube whose path of travel is directed so as to intersect that of the first stream, and an "output" tube located in the path of the first airstream so as to receive or collect a portion of the fluid air mass flowing therein. As will shortly be seen, with this basic amplifier circuit serving as a building block or basic module, it is possible to construct pneumatic logic elements of a wide variety of types such as AND circuits, OR circuits, MEMORY circuits, etc., and integrate such logic circuits into a complex network of a large number of elements to perform computer functions. In addition, as more fully appears hereinafter, fluid amplifiers of the type herein proposed, utilizing transitional effects of laminar and turbulent flow, possess novel and unusual properties which render them especially useful as primary sensing devices in many varied applications, including acoustical measurement, control and analysis; industrial process control; fire and burglar detection; etc.

The advantages inherent to a pneumatic amplifier element of the above-described design are manifold. There are no critical design tolerances requiring expensive precision machining operations. Such an element, utilizing transitional effects of laminar-turbulent flow phenomena, does not exhibit any hysteresis characteristics; consequently, a degree of proportional signal amplification can be achieved throughout a range. No impedance-matching problems, of the caliber posed by prior art devices, are presented in interconnecting a plurality of these elements into a pneumatic network or system. By virtue of the insulation from the input of the effects produced in the output or supply stream, the fluid amplifiers of the present invention are capable of performing satisfactorily certain logical functions involving the use of multiple input signals, each of which is ideally required to operate independently of the others (e.g., a logical NOR circuit)—an accomplishment which cannot be achieved with any type of fluid amplifier device previously known to the art.

Accordingly, it is a principal objective of the present invention to provide a novel fluid logic element which utilizes certain transitional phenomena of laminar and turbulent flow.

It is another objective of the present invention to provide a novel type of pneumatic amplifier element for use in pneumatic logic systems of structurally simple design, capable of proportional action throughout a range, and which does not exhibit any hysteresis effects.

It is yet another objective of the present invention to provide a pneumatic logic element which utilizes in a novel manner the interaction of a pair of fluid streams to obtain amplification.

And it is still another objective of the present invention to provide a novel type of pneumatic logic element which may be readily interconnected into pneumatic network systems without presenting substantial impedance-matching problems.

And it is a still further objective of the present invention to provide a novel type of fluid-actuated logic element which is capable of receiving a plurality of signal inputs to determine the nature of its output, while maintaining each signal input in isolation from the remainder of said inputs.

Other objectives, features and advantages of the present invention will be more readily apparent upon a consideration of the following detailed description of illustrative embodiments of the invention, taken in conjunction with the appended drawings in which.

Figure 1:
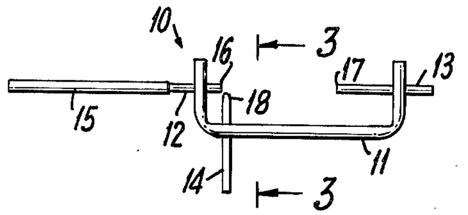
FIG. 1 is a front elevational view of an illustrative embodiment of a fluid-actuated element, exemplarily a pneumatic amplifier, constructed in accordance with the principles of the present invention.
Figure 3:
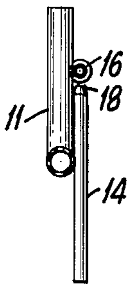
FIG. 3 is a cross sectional view as taken along the line 3—3 of FIG. 1.
Figure 2:
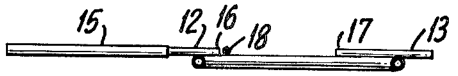
FIG. 2 is a top view of the embodiment shown in FIG. 1.

Referring now to FIGS. 1–3, there is shown therein a basic fluid amplifier element 10 embodying the principles of the present invention. This amplifier element 10 comprises a frame 11 which provides structural support for a first tube 12, hereinafter designated as the supply tube; a second tube 13, hereinafter designated as the output tube; and a third tube 14, hereinafter designated as the control tube. Attached to the supply tube 12 is a conduit 15 which is connected to any convenient source (not shown) of relatively smooth-flowing fluid, for example, air under pressure. As certain of the flow characteristics described below are exhibited only by submerged fluid streams, it is necessary that the amplifier element be operated within a fluid environment of the same character as the fluid actuating medium. For the exemplary embodiment shown in FIGS. 1–3, the actuating fluid is taken to be air; accordingly, the pneumatic element is operated in an environment of ordinary air or other suitable gaseous atmosphere. On the other hand, if the fluid amplifier element were actuated hydraulically by a liquid, then it would be necessary for the element to be operated submerged in a liquid environment.

The construction of the conduit 15 and the supply tube 12 is such that the air stream emerging from the orifice 16 of the supply tube is in the condition of laminar flow. This is most readily accomplished by having the air stream flow continuously from the source (not shown) within a smooth-surfaced passageway having no sharp bends or irregularities. The output tube 13 is arranged to be substantially colinear with the supply tube 12 and is disposed in a path of the air stream emergent from the orifice 16 of the supply tube.

Figure 4:
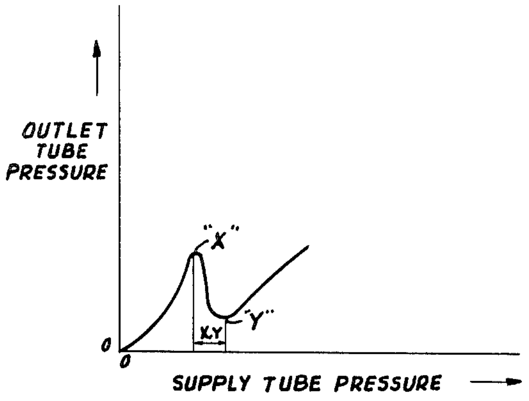
FIG. 4 is a graph showing certain representative characteristics exhibited by a pneumatic element constructed in accordance with the present invention.

For a predetermined separation between the orifice 16 of the supply tube 12 and the opening in the receiver or output tube 13, there is a relationship which exists between the pressure of the air fed into the supply tube and that of the air collected by the output tube disposed in the path of the stream. As shown in FIG. 4, wherein the ordinate of the curve represents the air pressure in the output tube and the abscissa represents the air pressure in the supply tube, up to a point there is a corresponding increase in the air pressure present in the output tube 13 as the air pressure supplied to the supply tube 12 is increased from zero. In other words, within this range, variations in the air pressure in the supply tube 12 are "sensed," in the form of corresponding variations in the air pressure present in the output tube 13.

At the point indicated as "X" on the curve, the air stream pressure created in the output tube 13 reaches a maximum, and then drops sharply as the pressure in the supply tube 12 increases until a minimum point "Y" is reached, whereupon further increase in the pressure of the supply stream produces a corresponding rise in the output pressure. Within the region "X–Y" the supply air stream, which hithertofore has remained in a condition of laminar flow throughout the spatial distance separating the supply tube 12 from the output tube 13, breaks down into a turbulent state.

In this transitional region, the point at which the fluid flow in the supply stream becomes turbulent is physically located just in front of the inlet orifice 17 of the output tube 13. Further increase in the pressure of the air stream causes the "point of turbulence" to proceed further upstream (i.e., to the left in FIG. 1); conversely, any decrease in the air stream pressure causes the point of turbulence to move downstream and hence further away from the orifice 16 of the supply tube 12. Consequently, point "X" in the curve of FIG. 4 corresponds to the situation in which the location of the point of turbulence in the supply stream has proceeded upstream, as the fluid pressure in the supply tube was increased, until it substantially coincides with the inlet orifice 17 of the output tube 13.

As the pressure in the supply tube is further increased beyond this point, the location of the point of turbulence proceeds closer towards the outlet orifice of the supply tube 12, and the fluid pressure sensed in the output tube drops sharply, as indicated in the curve. This sudden decline in the output pressure may be attributed to the fact that, because of the turbulence condition present in the air stream, a smaller portion of the total mass of the air stream flow is collected by the inlet opening 16 in the output tube 13 than would be the case if the fluid flow in the supply stream were to continue to remain in the laminar state. Beyond the point "Y" in the curve in FIG. 4, the air pressure sensed in the output tube 13 once again continues to rise as the supply tube pressure is increased; this latter condition results from the intake by the output tube of increasing amounts of air in the turbulent state.

The effect on the supply stream of the air stream interjected by the control tube 14 will now be considered. The orifice 18 of the control tube 14, as may be seen in FIGS. 1–3, is disposed adjacent to that of the supply tube 12 and directs a second stream of fluid flow, supplied from a source (not shown), at substantially right angles to the flow of the stream emergent from the orifice 16 of the supply tube 12.

Figure 5:
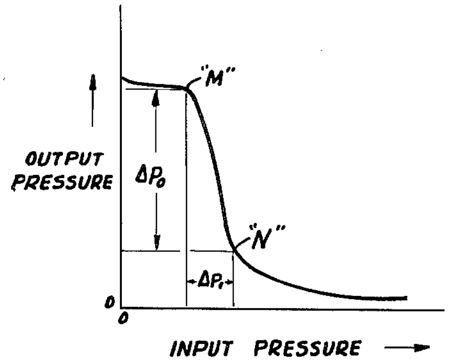
FIG. 5 is a graph showing a transfer relationship existing between the output and the input of a pneumatic element constructed in accordance with the principles of the present invention.

I have discovered that the presence of a fluid pressure of relatively small magnitude emergent from the orifice 18 of the control tube 14, which intercepts the air stream produced from supply tube 12, will cause the latter stream to become turbulent. This phenomenon is illustrated in the curve of FIG. 5, wherein the ordinate represents the air pressure sensed in the output tube 13 and the abscissa represents the air pressure introduced into the input of the control tube 14. For the conditions illustrated in the curve, the air stream pressure in the supply tube 12 is constant and of a magnitude such that the fluid flow in the space between the supply tube 12 and the output tube 13 is laminar in the absence of any air stream flow in the control tube 14.

As represented in FIG. 5, when the input pressure, i.e., the fluid pressure present in the control stream, is increased from zero, the output pressure, i.e., the fluid pressure sensed in the output tube, remains substantially unchanged from its initial value until point "M" is reached. At this point the interjected control stream begins to exert its influence and cause the heretofore laminar flow of the supply stream to break down into a turbulent condition. Accordingly, in a manner similar in effect to that illustrated in the curve of FIG. 4 wherein the pressure in the supply tube itself was the variable parameter, further increase in the input pressure beyond point "M" causes the pressure in the output tube 13 to drop sharply as the turbulence in the supply air stream becomes greater.

As the input pressure in the control tube is increased beyond the point "M," the pressure detected in the output tube 13 continues to fall sharply, as the flow in the supply air stream becomes increasingly more turbulent, until the point "N," which represents the condition where very little of the air stream mass remains in the original flow path to be collected by the output tube, is reached and accordingly, any increase in input pressure beyond this point does not exert any substantial effect on the pressure present in the output tube. In the region "M–N," representing the transition of the fluid flow in the supply stream from the wholly laminar to the wholly turbulent state, a relatively small change in input pressure, $\Delta p_i$, produces a correspondingly large change in the output pressure, $\Delta p_o$. Consequently, within this range, the structure illustrated in the embodiment of FIG. 1 performs the function of a fluid amplifier, in that pressure signals applied to the input or control tube 14 of the device are converted to variations in the supply stream appearing in the output tube 13 which are several orders of magnitude greater.

It will be understood that while the control tube 14 is preferably disposed to project a fluid stream at right angles to the fluid stream emanating from the supply tube 12, the flow interaction effects described above will take place so long as the interjected control stream intercepts the supply stream at an angular inclination having a substantial component perpendicular to the flow path of the supply stream.

The principles of operation of the fluid amplifier device of the present invention, which depend upon transitional effects of laminar and turbulent flow phenomena, produces a particularly advantageous result in that the curve of the typical operating characteristics, shown in FIG. 5, applies for decreasing, as well as increasing, input pressure; that is, the fluid amplifier device of the present invention does not exhibit any hysteresis effects. Furthermore, the substantially linear curve characteristic exhibited within the region "M–N" permits small-signal amplification which is proportional throughout a range.

Another important advantage of the fluid amplifier devices of the present invention is that the output of one amplifier can be connected directly to the input of another amplifier without requiring the use of added resistances or bias signals to obtain a desirable match. In this regard the fact that there is a slight, non-zero value for the pressure level which is present in the output tube of an amplifier, when the supply stream is in a turbulent state, is of negligible concern insofar as the direct interconnection of amplifiers is concerned.

Furthermore, a fluid amplifier constructed according to the principles of the present invention performs the equivalent of the logical NOT function with a single input; that is, an input signal, applied to the control tube, produces turbulence in the supply stream flow, and accordingly reduces the pressure level in the output tube to a low value. Rather than a single interjected control stream, it is possible to dispose two or more such control tubes adjacent to each other, and preferably substantially perpendicular to the trajectory of the supply stream, so that each, acting independently, will produce turbulence in the supply stream in the presence of a respective input signal of sufficient magnitude. Accordingly, with two or more such control stream inputs, a fluid amplifier is capable of performing the logical NOR function for any of the inputs. The number of control tube inputs which can be arranged in a single amplifier of the type proposed herein in order to individually produce turbulence in the supply stream (and thereby generate an output signal by changing the pressure sensed in the output tube by the amount $\Delta p_o$) is virtually limitless. This is so because each such input is, by the nature of the device, isolated from every other input and there is no feedback or reflection to the input of the transitional change in the state of the supply stream flow. To my knowledge this last-mentioned logic capability is not obtainable with any other type of fluid amplifiers heretofore known to the art.

In addition to their use in computer logic circuits, fluid amplifiers of the present type possess special properties as primary sensing devices which are of important value in many automatic control system applications. I have discovered that, as the separation distance between the orifice 16 of the supply tube 12 and the intake 17 of the output tube 13 is increased, the fluid amplifier device becomes increasingly sensitive to the presence of acoustic waves in the atmospheric environment in which the device is operated. The degree of acoustic sensitivity becomes extremely high when the separation distance is increased to about twice the distance normally employed for maximum signal amplification (the factors influencing the determination of this optimum separation distance for signal amplification purposes are set out in the Appendix). Furthermore, certain embodiments of these acoustically-sensitive amplifiers may be adjusted to be responsive only to frequencies within a predetermined range. These acoustical sensitivity and selectivity properties make the fluid amplifiers of the present invention particularly suitable for many industrial tasks wherein the nature of the sound signal is indicative of the performance of a mechanism, e.g., determination of whether a motor is operating or not, whether a shaft's bearings are running smoothly, etc.

In similar manner fluid amplifiers of the present type may be suitably adapted so as to be extremely sensitive to very slight variations in the flow of a gas or liquid stream. In lieu of the presence of a distinct control tube element, a fluid stream, representative of the atmosphere or fluid stream being monitored, can be directed at the laminar fluid stream flowing in the open space separating the orifice of the supply tube from that of the output. In this manner, an interjected stream possessing a very low velocity can be utilized as the means for converting the laminar flow of the supply stream into the turbulent state.

This adaptability for detecting extremely small variations in fluid flow is a valuable property of the present amplifiers—a property which is especially useful in certain applications where these fluid amplifiers can be utilized in a manner akin to that of photosensitive cells. By way of example, consider an air stream projected over a spatial distance and used as an input (i.e., as an interjected control stream) to maintain the supply stream of the fluid amplifier in a minimum output condition (i.e., in a turbulent state). When a physical object is then placed in the path of the projected air stream, thereby interrupting the control signal input, the amplifier will return to the laminar state, thus producing a rise in the pressure level appearing in the output tube. This pressure rise in turn can be utilized as a signal indicative of the fact that the projected air stream has been interrupted. Similarly, the extreme sensitivity of the present fluid amplifiers to variations in atmospheric or other fluid streams can also be utilized in fire and burglar detection, as well as in industrial process control systems requiring the monitoring or measurement of small variations in low velocity gas or liquid flows.

A fluid-actuated element, constructed according to the principles of the present invention, may be utilized in conjunction with similar elements to produce a wide variety of useful components suitable for fluid circuit applications. Some of the components, which may be produced through the utilization of basic amplifier elements employing the transitional fluid flow techniques of the present invention, are illustrated in FIGS. 6–9. Other components utilizing the teachings of the present invention may be readily designed and fabricated through comparison with their electronic analogues and, therefore, the fluid circuit components described below are merely exemplary of a broad class of devices to which my invention may be advantageously applied.

Figure 6:
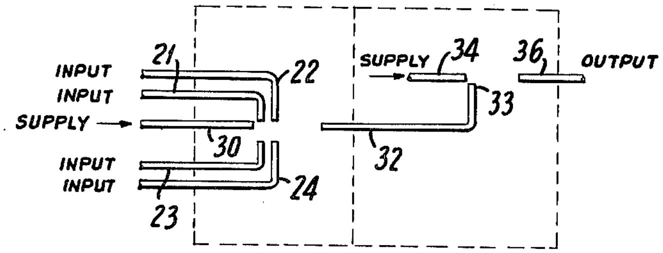
FIG. 6 is an OR logic circuit for a pneumatic computer system which utilizes certain teachings of the present invention relation to transitional flow phenomena.

FIG. 6 illustrates a logical OR circuit, suitable for use in a pneumatic computer system, which is constructed in accordance with the teachings of the present invention. It will be recalled that the OR circuit is a multiple-input logical device which performs the function of generating an output signal whenever there is a signal present at one or more of its respective inputs. As shown in FIG. 6, a plurality of separate inputs are fed to corresponding control tubes 21, 22, 23, 24, of a first fluid amplifier stage, each of which, upon the application of an input signal, will direct a fluid "control" stream for interaction with a single fluid "supply" stream, which is obtained from a suitable external source of pressure (not shown) and emanates from supply tube 30.

If a control stream is generated in any of the respective control tubes 21–24, the flow of the stream from the supply tube 30 will cease to be laminar and, in accordance with the principles discussed earlier, the pressure level "sensed" in the receiving or intermediate output tube 32 will drop sharply, thus producing an output signal. The intermediate output tube 32 in turn becomes the control tube for a second fluid amplifier stage, wherein the presence or absence of a nominal fluid pressure level, provided by the flow emanating from the outlet orifice 33 of tube 32, is utilized to operate this stage of the device. Accordingly, the presence of an input signal in any one or more of the control tubes 21–24 will cause a severe drop in the fluid pressure level in tube 32; this in turn will cause the fluid flow emanating from the supply tube 34 of the second-stage amplifier to be restored to a laminar state. Upon such restoration of the supply air stream flow, the pressure level present in the output tube 36 of the second-stage amplifier rises to a high level. Consequently, the circuit device of FIG. 6 performs the logical OR function by reproducing a fluid pressure signal at its output 36 whenever there is one or more input signals applied to respective control tubes 21–24.

Figure 7:
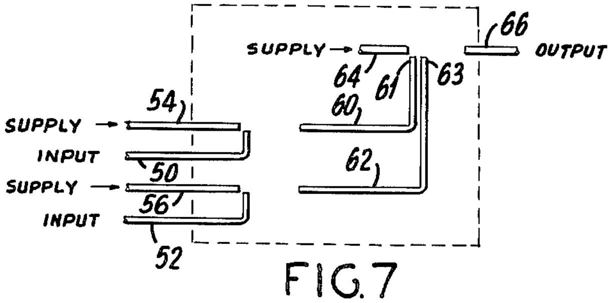
FIG. 7 is an AND logic circuit for a pneumatic computer system utilizing certain teachings of the present invention relating to transitional flow phenomena.

FIG. 7 is illustrative of a logical AND circuit for a pneumatic computer which utilizes the teachings of the present invention. This circuit will generate an output pressure signal in tube 66 only when input signals are simultaneously applied to the input tubes 50 and 52. Supply tubes 54, 56, and 64 are supplied with a relatively high pressure fluid flow from a suitable external source (not shown). As may be seen, the operation of the device is such that if fluid input signals are applied to both of the control tubes 50 and 52, the pressure level in each of the corresponding intermediate output tubes 60 and 62 will drop to a low level. Only when this occurrence happens simultaneously will the air stream emanating from the supply tube 64 be restored to the laminar state, thus permitting a fluid pressure of relatively high intensity to appear in the output tube 66. It will be readily appreciated that the present circuit will perform the AND function for any given number of inputs merely by providing an associated fluid amplifier stage, similar to that of supply tube 54, control tube 50 and intermediate output tube 60, for each separate input desired. The outlet orifices of the intermediate output tubes for all these fluid amplifier stages are then disposed, similar to those (61 and 63) shown, at right angles to the stream flow emanating from the supply tube 64.

Figure 8:
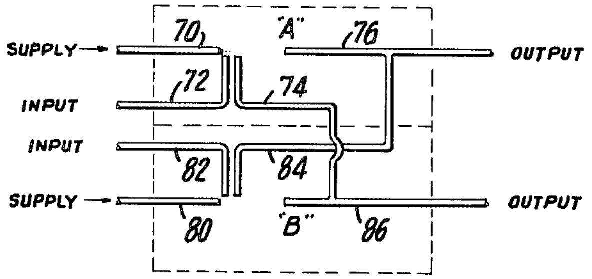
FIG. 8 is a FLIP-FLOP circuit for use in a pneumatic system which utilizes certain teachings of the present invention relating to transitional flow phenomena.

FIG. 8 is a circuit means for obtaining a bistable condition or memory property in a fluid-actuated device, through utilization of the transitional flow principles of the present invention. The circuit arrangement illustrated in this figure is the fluid analogue of an electronic FLIP-FLOP circuit. Basically, the circuit element comprises two fluid amplifier stages which are interconnected such that only one amplifier may exist in the "on" state at a particular time—the "on" state corresponding to the laminar or non-turbulent condition of its associated supply air stream flow.

The first amplifier stage "A" comprises a supply tube 70, a first control tube 72 which receives the input signal, a second control tube 74, and an output tube 76; the second amplifier stage "B" comprises supply tube 80, a first control tube 82 which receives the respective input signal for the second stage, a second control tube 84, and a corresponding output tube 86. The respective output tubes 76, 86, of each of the amplifier stages, are connected to each other by the pair of second control tubes 74, 84—an interconnection which permits, in a manner similar to the electronic analogue, the condition of the output of each amplifier stage to control the state of the other.

In the nature of things only one of the amplifier stages will be in the "on" or non-turbulent state at a given instant in time, while the other will be held in the "off" or turbulent state by reason of the output pressure signal generated by the first amplifier stage. Which amplifier stage is "on" and which is "off" is determined by which one was last placed in the "off" state by a pressure signal input applied to one of the two control tubes 72, 82. If amplifier stage A in the figure is turned "off" by an input signal applied to its associated first control tube 72, it will be maintained in the "off" state indefinitely by the output of amplifier stage B energizing A's second control tube 74. If, on the other hand, amplifier stage B is turned "off," by a signal input applied to its first control tube 82, the converse will be true; that is, if B were initially "off," it will remain "off," whereas, if B were "on" initially, it will now be turned "off" and A will switch to the "on" condition. In order for this fluid FLIP-FLOP circuit to operate properly, it is essential that the pressure levels present in the respective output tubes 76, 86 of each amplifier stage be approximately the same so as to make the operation of the circuit symmetrical.

Figure 9:
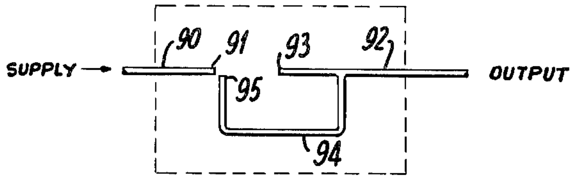
FIG. 9 is a pneumatic oscillator circuit which utilizes certain teachings of the present invention relating to transitional flow phenomena.

FIG. 9 illustrates a construction of a fluid oscillator circuit which utilizes certain of the principles of the present invention regarding transitional laminar-turbulent flow phenomena. As shown, the supply tube 90, which receives a stream of gas or liquid flow from a suitable external source (not shown), generates at its outlet orifice 91 a fluid stream flow directed at the intake 93 of an output tube 92. A portion of the fluid flow generated in the output tube 92 is diverted and fed back via tube 94 to emerge from orifice 95 as a control stream interacting with the supply air stream.

By proper adjustment of the parameters of this fluid device, the feedback signal produced in the tube 94 will be of sufficient magnitude to cause the supply stream to become turbulent, thus essentially cutting off the flow of fluid into the output tube 92. As this happens, the fluid pressure in the control stream falls towards zero, permitting the supply stream to resume its laminar flow. In this manner the pressure level signal appearing in the output tube 92 undergoes periodic cyclic variation at a frequency determined, among other things, by the magnitude of the supply stream pressure; the respective diameters and orifice dimensions of supply tube 90, output tube 92, and feedback tube 94; and the length of the return path for the feedback signal.

Fluid devices of the present invention, utilizing turbulence phenomena to obtain amplification, may be constructed in embodiments similar to that shown in FIG. 1, throughout a range of sizes which are influenced by the nature of the fluid liquid or gas used as the actuating medium. Although few of the design parameters of the fluid amplifiers herein described are critical, the dimensional relationships between the various structural elements are prescribed in accordance with several factors. Certain of these relationships are set forth in detail in the following Appendix which recites some design criteria to be followed in the construction of an operable fluid amplifier utilizing the transitional flow principles of the present invention. It is to be understood that the quantitative dimensions and values given therein are exemplary only, and in no wise are to be considered as limiting the scope of the invention described herein.

APPENDIX

Certain design rules relating to the dimensional and spacing relationships of the various elements comprising a fluid amplifier device should be observed in constructing operative embodiments of the present invention. Among the most important considerations in the design of an amplifier, such as the embodiment shown in FIG. 1 of the drawings, are: (1) the length and diameter (or taper or series of diameters) of the supply tube 12; (2) the distance between the outlet orifice 16 of the supply tube 12 and the inlet orifice or intake 17 of the output tube 13; (3) the diameter of the output tube 13; (4) the diameter of the control tube 14 and its location relative to the supply tube 12; (5) the nature of the atmospheric environment immediately surrounding the amplifier device 10; and (6) the character and pressure of the fluid delivered to the supply tube 12 by the conduit 15.

Among the most important factors which should be considered in the design of a fluid amplifier device, constructed according to the teachings of the present invention, are the diameter and length of the supply tube 12. In the following analysis, it will be presumed that the inner diameter of the supply tube is smooth, and that its ends are cleanly cut without burrs or other projections.

A fluid flowing at low velocity through relatively long tubing of small diameter tends to move in a laminar stream. By a laminar stream is meant that the molecules of fluid in the stream tend to flow in straight lines parallel to the walls of the confining tube. Furthermore, the molecules near the walls of the tube move slowly because of frictional effects, while those in the center of the stream move swiftly. All the molecules, however, travel as though in "layers," as there is relatively little motion from one part of the stream to another having a different velocity. Accordingly, a laminar stream may be defined as that possessing the property that all of the particles flowing within the stream have very low components of velocity perpendicular to the velocity of the stream as a whole. As stream velocity increases, frictional effects between the various "layers" of the stream also increase to the point where any random molecular movement of particles in the stream from one velocity level to another produces a violent disruption of the laminar character of the stream—a condition eventually leading to total turbulence in the stream flow.

The velocity of the molecules in a flowing stream is difficult to measure in terms of linear units, such as feet per minute; however, velocity may be, and is, conveniently measured and stated in terms of the corresponding static pressure produced in an orifice inserted within the stream. Consequently, although the parameter under observation in the following example is actually stream velocity, it will be delineated in terms of static pressure.

I have found from experimental observation that, exemplarily, a relatively long, smooth-walled supply tube of 0.078 inch internal diameter can project an air stream from its orifice in laminar form at an approximate static pressure of two inches of water. Any increase in the velocity of the stream beyond this static pressure results in the air stream flow becoming turbulent within the supply tube itself. On the other hand, I have found that, when a supply tube of similar length with an 0.030 inch internal diameter is used, a stream velocity corresponding to a static pressure of nearly nine inches of water can be obtained before turbulence occurs within the tube. The reason why the tube of smaller diameter transmits a higher velocity air stream without turbulence than a larger tube may be explained, on a simplified basis, as being due to the fact that a larger percentage of the air particles in the smaller-diameter tube is subjected to frictional effects with the walls of the tube, and consequently there is less opportunity existing for particle motion perpendicular to the direction of the stream as a whole.

As far as the optimum design length for the suply tube is concerned, the length required to reduce the motion of particles perpendicular to the stream direction to a minimum (and thus minimize the tendency towards turbulence in the stream) is related to the diametric size of the tube. For example, a six-inch length of 0.030 inch diameter tube will be substantially as effective as a thirty-inch length of the same tube, so long as the air flowing into it approaches the tube directly rather than at an angle. On the other hand, the above statement does not necessarily remain true as the diameter of the tube is increased; by way of illustration, I have found that the effectiveness of an eighteen-inch length of 0.078 diameter tubing, in reducing turbulence, is markedly less than that of a thirty-six inch length, and that bends or irregularities of any type in the larger diameter tubing substantially increase the tendency for turbulence to be produced in the air stream.

If air is fed to the supply tube in a quiet environment (i.e., relatively free from the presence of acoustic disturbances), I have found that, exemplarily, a one-half-inch length of tubing of 0.030 inch internal diameter is capable of producing a laminar air stream flow, which is useful for fluid amplifiers of the present type, when this tubing is preceded by a somewhat longer length (e.g., one-and-a-quarter inches) of tubing having a 0.060 inch internal diameter. With such a two-stage arrangement the supply tube may then be connected to flexible plastic or rubber tubing having moderate bends without severely disturbing the character of the laminar flow from the jet orifice of the tube.

It is usually desirable to minimize the length of tubing required for the supply jet, not only from the standpoint of structural convenience and space requirements, but also because a larger source pressure is required to obtain an air stream of given velocity at the orifice of the supply tube as the length of the tubing is increased.

The choice of diameter for the outlet jet of the supply tube is also in part determined by the spatial distance separating the orifice of the supply jet and the intake of the output tube of the fluid amplifier. Generally speaking, this separation should be selected so as to maintain a degree of balance between two conflicting requirements in the design of fluid amplifiers of the type proposed herein. The first of these requirements is that the separation between the supply jet and output tube be sufficiently small so as to obtain, from the high-velocity laminar fluid stream which emerges from the supply tube and travels a limited distance in open atmosphere, a resultant pressure in the output tube of relatively high magnitude. The second requirement is that this same output tube receive a minimum amount of fluid mass from the supply stream when the latter is made turbulent; in other words, when the supply stream of the fluid amplifier is in a turbulent condition, the static pressure level sensed in the output tube of the device should ideally be as close to zero as possible. As will be readily appreciated, the first of these requirements indicates that the separation distance between the supply and output tubes should be made very small, while the second requirement indicates that this distance should be made very large.

In practice a compromise must of necessity be made and the separation distance is preferably selected such that the fluid stream flow, detected in the output of the amplifier device when the supply stream is made turbulent, will be of sufficiently low pressure level that no effect is produced in a subsequent amplifier of the same type, when the output of the first is directly connected to the input of the second; that is to say that the separation should be selected such that a first amplifier may be utilized to operate a second by direct connection and without the use of any special biasing pressures.

Because of the tendency of the laminar stream issuing from the orifice of the supply jet to break down into a turbulence condition, irrespective of the presence or absence of external disturbances, the separation distance must be carefully chosen in order to satisfy both of the above requirements. Discussion has been had earlier as to the effect on the nature of the laminar flow within the supply tube of the length and diameter of the tubing—the conclusion being that the smaller the internal diameter of the tube, the greater the velocity of the fluid which could be satisfactorily transmitted through it in laminar fashion. However, once the laminar fluid stream emerges from the orifice of the supply tube, the factors which prevail within the supply tube cease to exist, and the condition which then prevails is that of a fluid stream flowing within an atmosphere comprised of the same or of a similar fluid. The fluid stream which issues from the jet orifice of the supply tube continues in a laminar fashion for a short distance of its trajectory, and then abruptly breaks into a turbulent state.

As indicated in the curve of FIG. 4, the point at which the fluid stream first becomes turbulent can be moved closer to the orifice of the supply tube by increasing the velocity of the stream, and conversely, it can be moved away by decreasing the velocity of the fluid stream. Consequently, as discussed previously herein, an output tube having an intake orifice located relatively close to and at a fixed distance from a supply tube will obtain a static pressure within it which will be related to the pressure in the supply tube (the independent variable).

The distance which an initially laminar stream, flowing from the orifice of a supply jet, will remain in a coherent state is determined by a number of factors. First, as discussed above, there is the matter of the pressure level present in the supply tubing. Secondly, the extent to which the stream will remain laminar, at its point of departure from the jet orifice of the supply tube, will be related to the over-all geometry of the orifice and the nature of the pressure source applied to the supply tube. Lastly, as indicated by the earlier discussion relating to the curve of FIG. 5, the nature and magnitude of the disturbances deliberately introduced in the fluid stream flow, through the impingement of one or more other fluid streams on the supply stream after its emergence from the orifice of the supply tube, will exert considerable influence on the nature of the fluid flow of the supply stream after the point of interception.

The second of the factors listed above, i.e., the over-all geometry of the supply jet, has been commented on previously in this Appendix to the extent of indicating, in a general fashion, some representative maximum laminar stream velocities which can be readily attained by supplying air under pressure in tubings of various size and length. As has been noted, the distance which a stream of air may be projected from a jet orifice in a laminar state and at a given velocity varies considerably with the diameter of the air stream. I have found that an air stream having a pressure of 3.5 inches of water, for example, may be projected as a laminar stream about 1.2" by a jet orifice of 0.063" I.D. (internal diameter), but only approximately 1" by a 0.030" I.D. jet, and less than ½" by a jet of 0.015" I.D. Similarly, it has been found that, while a jet of 0.030" I.D. can project a laminar air stream over a distance of 1.2" at a maximum pressure of only 2.5 inches of water, a larger jet of 0.063" I.D. can project a laminar stream over the same distance at a pressure of 3.5 inches of water.

As a result of the above empirical observations I have concluded that the optimum spatial separation between the orifice of the supply tube and the intake of the output tube, of fluid amplifiers of the type embraced within the present invention, is determined to a considerable extent by the diameter selected for the jet orifice of the supply tube, but that there is no simple linear relationship existing between the two. The over-all geometry of the supply jet establishes, to a great extent, the maximum distance over which a fluid stream at a given pressure can be projected in laminar form; consequently, this maximum distance must be taken into consideration in any design decision directed at establishing the optimum separation distance between the supply and output tubes of a fluid amplifier device of the design proposed herein.

In an illustrative embodiment of my invention utilizing an air stream having a pressure of approximately 2.5 inches of water as the supply stream in a pneumatically-actuated amplifier, wherein a two-stage construction comprising a first section of 1¼" length of 0.060" I.D. tubing and a following section of ½" length of 0.030" I.D. tubing is utilized in the design of the jet orifice for the supply tube, I have found that a separation distance of approximately ⅞" between the supply jet and the intake of the output tube will satisfactorily fulfill both of the performance requirements for a fluid amplifier designed for direct system interconnection.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A fluid amplifier utilizing laminar-turbulence phenomena comprising:
- (a) a supply tube having predetermined parameters capable of producing a laminar stream,
- (b) means to feed fluid through the supply tube with a specified velocity relative to said parameters at which there is produced a main stream having a laminar flow pattern which is projected from the supply tube,
- (c) an output tube in axial alignment with said supply tube and spaced therefrom at a distance to receive the projected laminar main stream,
- (d) a control tube having an inlet and an outlet, said tube disposed to convey a control stream along a path which angularly intercepts the flow of the projected laminar main stream between the supply and output tubes, and
- (e) means to feed a unidirectional fluid to the inlet of the control tube with a velocity producing a control stream having sufficient energy to create turbulence in the projected main stream while said main stream remains in a substantially undeflected state, at a point therein in advance of the output tube, whereby the pressure at the output tube is reduced to a value below that produced when the stream is laminar.

2. The invention according to claim 1 characterized in that the angular inclination of the control stream is substantially perpendicular to the path of the main stream.

3. Apparatus for amplifying a fluid signal, utilizing laminar-turbulence phenomena, comprising in combination:
- (a) a first tube having an outlet orifice of predetermined parameters capable of producing a laminar stream;
- (b) means to feed fluid through the first tube with a specified velocity relative to the parameters which produce a main stream having a laminar flow pattern which is projected from the supply tube;
- (c) the main stream having a laminar flow path existing for a predetermined length;
- (d) a second tube used as an output for the apparatus and having an intake in the flow path of the main stream and receiving a portion of its flow, and at a distance at which the projected main stream is received in laminar form;
- (e) a third tube having an inlet and an outlet, said inlet connected to receive a unidirectional fluid signal input to the apparatus;
- (f) the fluid input signal emerging from an exit orifice of a third tube as a control stream intercepting the flow path of the projected laminar supply stream upstream of the intake of the second tube;
- (g) the control stream being adapted to cause the flow of the supply stream to become turbulent while said supply stream remains in a substantially undeflected state at a point therein in advance of the output tube greatly decreasing the portion of the flow received by the second tube; whereby the presence of a fluid input signal of predetermined magnitude produces an amplified change in the output flow appearing in the second tube.

4. The invention according to claim 3 wherein the exit orifice of the third tube is disposed substantially perpendicular and adjacent to the outlet orifice of the first tube.

5. A fluid-actuated element for performing logical functions comprising:
- (a) a first tube having an outlet orifice of predetermined parameters capable of producing a laminar stream;
- (b) means to feed fluid through the first tube with a specified velocity relative to the parameters which produce a main stream having a laminar flow pattern which is projected from the supply tube.
- (c) the main stream having a laminar flow path existing for a predetermined length;
- (d) a second tube used as an output for the apparatus and having an intake in the flow path of the projected laminar main stream and receiving a portion of its flow, and at a distance to receive the projected laminar main stream;
- (e) a group of control tubes, each control tube having an inlet and an outlet, said inlet connected to receive at one end, respectively, a separate unidirectional fluid signal input to the element;
- (f) each of the fluid input signals emerging from an exit orifice of its respective control tube as a separate control stream intercepting the path of the supply stream upstream of the intake of the second tube,
- (g) each of the control streams being adapted to individually cause the flow of the supply stream to become turbulent while said supply stream remains in a substantially undeflected state at a point therein in advance of the output tube, and
- (h) each of the control streams acting on the supply stream independently of and uninfluenced by any of the other of the control streams, whereby the application of a respective fluid input signal of predetermined magnitude to any of the control tubes produces a marked reduction in the output flow in the second tube.

6. A fluid-actuated oscillator for generating a periodic signal comprising,
- (a) a first tube having an outlet orifice of predetermined parameters capable of producing a laminar stream;
- (b) means to feed fluid through the first tube with a specified velocity relative to the parameters which produce a main stream having a laminar flow pattern which is projected from the supply tube;
- (c) the main stream having a laminar flow path existing for a predetermined length;
- (d) a second tube used as an output for the oscillator and having an intake in the flow path of the main stream and receiving a portion of its flow, and at a distance to receive the projected laminar main stream;

(e) means connected to the second tube for feeding back a predetermined amount of the fluid flow received in the second tube as a undirectional control stream intercepting the flow path of the projected laminar main stream upstream of the intake of the second tube;

(f) the control stream being adapted to cause the flow of the supply stream to become turbulent while said supply stream remains in a substantially undeflected state at a point therein in advance of the output tube greatly decreasing the portion of the flow received by the second tube; whereby the degenerative nature of the feedback flow in the control stream produces periodic variations in the output flow appearing in the second tube.

References Cited by the Examiner

UNITED STATES PATENTS

| | | | |
|---|---|---|---|
| 1,205,530 | 11/1916 | Hall | 340—253 |
| 1,628,723 | 5/1927 | Hall | 200—81 |
| 2,408,603 | 10/1946 | Braithwaite et al. | 137—111 |
| 2,408,705 | 10/1946 | Todd | 121—41 |
| 3,001,539 | 9/1961 | Hurvitz | 137—83 |
| 3,024,805 | 3/1962 | Horton | 137—597 |
| 3,075,548 | 1/1963 | Horton | 137—597 |

FOREIGN PATENTS

| | | |
|---|---|---|
| 1,278,782 | 11/1961 | France. |

OTHER REFERENCES

"Scientific American," vol. 207, No. 2, August 1962 (pages 128–138).

M. CARY NELSON, *Primary Examiner.*

LAVERNE D. GEIGER, *Examiner.*